(12) United States Patent
Tsuzuki

(10) Patent No.: US 7,488,998 B2
(45) Date of Patent: Feb. 10, 2009

(54) SOLID-STATE IMAGING APPARATUS

(75) Inventor: Takao Tsuzuki, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 284 days.

(21) Appl. No.: 11/490,079

(22) Filed: Jul. 21, 2006

(65) Prior Publication Data

US 2007/0035648 A1 Feb. 15, 2007

(30) Foreign Application Priority Data

Aug. 10, 2005 (JP) .............................. 2005-231905

(51) Int. Cl.
*H01L 29/26* (2006.01)
(52) U.S. Cl. ........................................ 257/239; 257/72
(58) Field of Classification Search .................. 257/72, 257/239
See application file for complete search history.

(56) References Cited

FOREIGN PATENT DOCUMENTS

JP 10-117306 5/1998

*Primary Examiner*—Douglas M Menz
(74) *Attorney, Agent, or Firm*—Young & Thompson

(57) ABSTRACT

A solid-state imaging apparatus includes a plurality of photoelectric conversion devices, a charge transfer device for transferring a signal charge converted by the photoelectric conversion devices, a signal charge detection portion for converting a signal charge transferred by the charge transfer device into a signal voltage, a reset circuit for resetting a potential of the signal charge detection portion, and an amplification portion for amplifying the signal voltage. The amplification portion includes a two-stage source follower, each supplied with power supply voltages different from the power supply voltage to be supplied to the reset circuit. The second stage source follower includes drive transistor, and a current source that changes a current amount according to a fluctuation of the reset potential VRD.

10 Claims, 8 Drawing Sheets

RELATED ART

SOLID-STATE IMAGING APPARATUS

BACKGROUND OF THE INVENTION

1. Field of the Invention

The present invention relates to a solid-state imaging apparatus, and particularly to a solid-state imaging apparatus aiming for low power consumption of an output circuit.

2. Description of Related Art

In recent years, in an electronic equipment using a solid-state imaging apparatus such as a digital camera, a copier, and a scanner, there is a distinct move towards increasing the number of pixels as well as achieving higher speed. Along with the move, amount of current that flows in an output circuit of a solid-state imaging apparatus increases. The increase in the amount of current causes to increase power consumption in a solid-state imaging apparatus and calorific value.

FIG. 4 is a view showing a general linear image sensor. Charges photoelectric converted and accumulated in an array of light receiving devices 200 is read out to a shift register 202 through a readout gate 201 that is supplied with a readout gate pulse ϕTG. The charge read out to the CCD shift register is sequentially transferred and converted into a signal voltage in a signal charge detection unit 203 formed in a floating diffusion region, that converts a signal charge into a signal voltage. The converted signal voltage is outputted to the outside by an output circuit 204 which is comprised of an analog circuit including a source follower and an inverter etc.

FIG. 5 is a waveform chart showing the readout gate pulse ϕTG and an output signal Vout. In order to speed up, a transfer rate of the CCD shift register must be increased so as to shorten the time needed to read out the signal charge of the light receiving portion. Further, a cycle of the ϕTG pulse must be shortened. The time needed to read out data in one line must be shortened in this way.

To shorten the time needed to read out the signal charge in each light receiving device, frequency characteristic of an output circuit comprised of an analog circuit must also be increased. Specifically, for a transistor included in the output circuit, a gate length L must be shortened and a gate width W must be widened to increase a frequency characteristic of a source follower and the like. However it increases an amount of current that flows the output circuit, thereby inducing to increase calorific value.

Further, an amount of the charge Q photoelectric converted at the array light receiving portion can be expressed as;

$$Q = \eta \times L \times Ttg$$

wherein L is a quantity of light, η is a photoelectric conversion efficiency, and Ttg is a time for accumulating charge.

By increasing the number of reading out the charge photoelectric converted and accumulated in the light receiving portion to the CCD shift register in order to speed up, the time for the light receiving portion to accumulate charges in the light receiving portion Ttg is shortened. Accordingly, if the quantity of light in light source remains the same, the amount of charge photoelectric converted Q is consequently reduced due to higher speed. If the amount of charge is reduced, necessary amplitude as an output voltage (dynamic range) cannot be obtained, thus a gain of an output circuit must be increased. This indicates that the number of transistors in a circuit needs to be increased, accordingly increasing power consumption. Even if the quantity of light is increased to complement it, there is another problem that power consumption in a light source increases.

As described in the foregoing, a problem of increasing power consumption is unavoidable for speeding up.

One method of resolving the problem of increasing power consumption for an output circuit is disclosed in Japanese Unexamined Patent Application Publication No. 10-117306. An output circuit disclosed in Japanese Unexamined Patent Application Publication No. 10-117306 is shown in FIG. 6. FIG. 6 shows a signal charge detection unit and an output circuit for the solid-state imaging apparatus shown in FIG. 4, and a reset circuit that is not shown in FIG. 4. Signal charges sequentially transferred are converted into signal voltage in a signal charge detection portion 2, and outputted to the outside through the output circuit 103. The reset circuit 1 is to reset a potential of the signal charge detection portion 2 and output each signal charge being sequentially transferred to specify a reset potential. The output circuit 103 for amplifying the signal voltage is comprised of two-stage source follower 4 and 105. The source follower 4 connects a constant current source 7 to a source side of a transistor 6. The source follower 105 connects a constant current source 109 to a source side of a transistor 8. Further, a power supply voltage VOD 1 to be supplied to a first stage source follower 4 is used in common with a power supply voltage VRD to be supplied to a reset circuit 1. Further, by making a power supply voltage VOD 2 to be supplied to the second stage source follower 105 lower than the power supply voltage VOD 1 to be supplied to the first stage source follower 4, the power consumption is reduced.

However as in a case above, if a potential of the power supply voltage VOD 2 of the second stage source follower 105 is made to be different from a potential of the power supply voltage VRD of the reset circuit 1 and a potential of the power supply voltage VOD 1 of the first stage source follower 4, with the voltages being supplied externally, the power supply voltages may fluctuate independently. Generally, if a voltage inputted to a source follower remains the same, a fluctuation of an output voltage from the source follower caused by a fluctuation of power supply voltage is not large enough to be a problem. However a fluctuation of reset potential VRD fluctuates an input potential of the source follower 105, thereby fluctuating an amplitude range (dynamic range) of an output voltage. For example as shown in FIG. 7, if an input potential of a source follower fluctuates to a lower potential, an amplitude range of an output voltage becomes narrow.

Especially as shown in FIG. 8, in a case an inverter circuit 120 is provided as a subsequent circuit of the source follower 105 so as to increase a gain of an output circuit, an influence from a fluctuation of power supply voltage becomes large. The more an amplification gain of the inverter circuit 120 increases, the narrower a range becomes for an input voltage of the inverter circuit is able to input. Accordingly, if the output voltage of the source follower fluctuates due to a fluctuation of the reset potential VRD, the input voltage of the inverter circuit fluctuates, and the input voltage may go outside a range for the inverter circuit is able to input. The output circuit correspondingly may not operate. Even if the input voltage is within a range in which the inverter circuit is able to input, an amplitude range (dynamic range) of an output voltage from a source follower may need to be narrowed in comparison to a case comprising only source followers. These issues impose restrictions on a gain and a dynamic range of an output circuit, thus create a major problem in designing an output circuit having a higher gain and a wider dynamic range.

SUMMARY OF THE INVENTION

According to an aspect of the present invention, there is provided a solid-state imaging apparatus that includes a plurality of photoelectric conversion devices, a charge transfer device for transferring a signal charge converted by the photoelectric conversion devices, a signal charge detection unit for converting the signal charge being transferred by the charge transfer device into a signal voltage, a reset circuit for resetting a potential of the signal charge detection unit, and an amplification unit for amplifying the signal voltage. The amplification portion includes a first source follower supplied with a second power supply voltage that is different from a first power supply voltage to be supplied to the reset circuit. The first source follower includes a driver transistor and a current source that is connected to the driver transistor and an amount of current changes according to a fluctuation of the first power supply voltage.

In the present invention, a current amount of a current source comprising a source follower can be changed according to a fluctuation of a power supply voltage. The source follower is capable of changing input/output characteristics by the current amount of the current source being changed. Therefore, even if an input voltage of the source follower fluctuates due to a fluctuation of a power supply voltage, it is possible to eliminate an influence to the output voltage by changing input/output characteristics of the source follower. Therefore the solid-state imaging apparatus of the present invention enables to realize low power consumption and reduce an influence from a fluctuation of power supply voltage.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposes.

Figure 1:
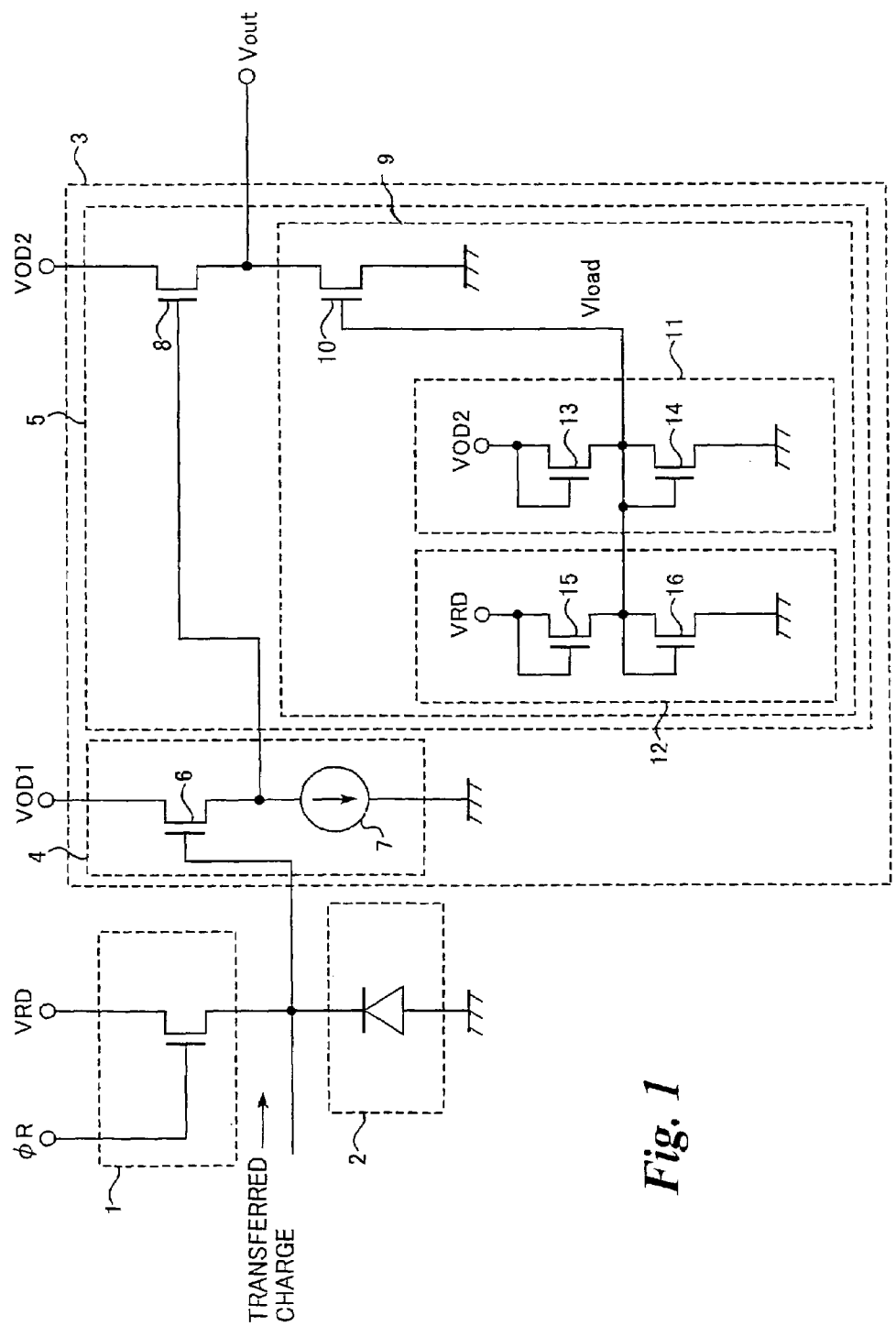
FIG. 1 is a schematic diagram showing a solid-state imaging apparatus according to an embodiment of the present invention.
Figure 6:
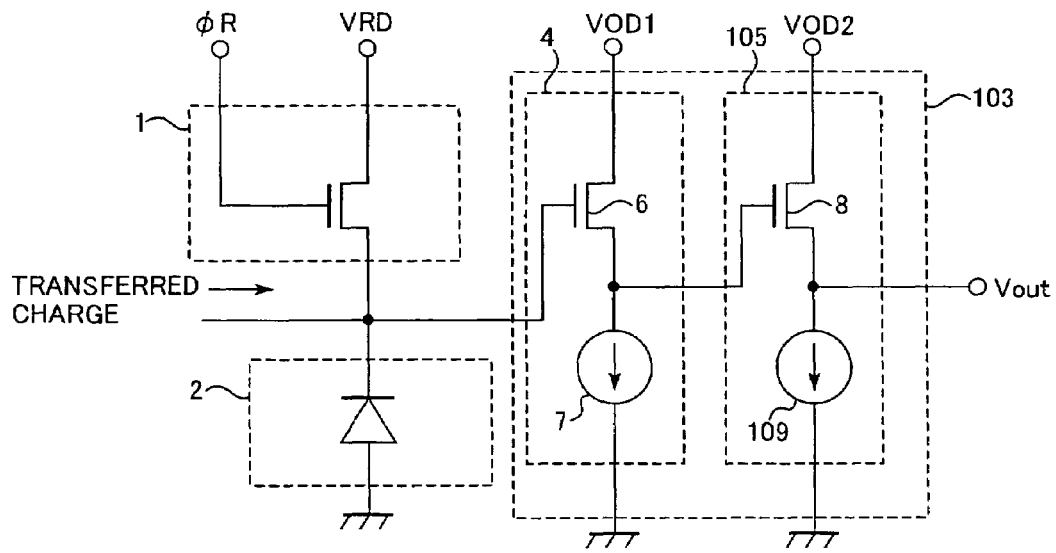
FIG. 6 is a schematic diagram showing a solid-state imaging apparatus according to a conventional technique.
Figure 7:
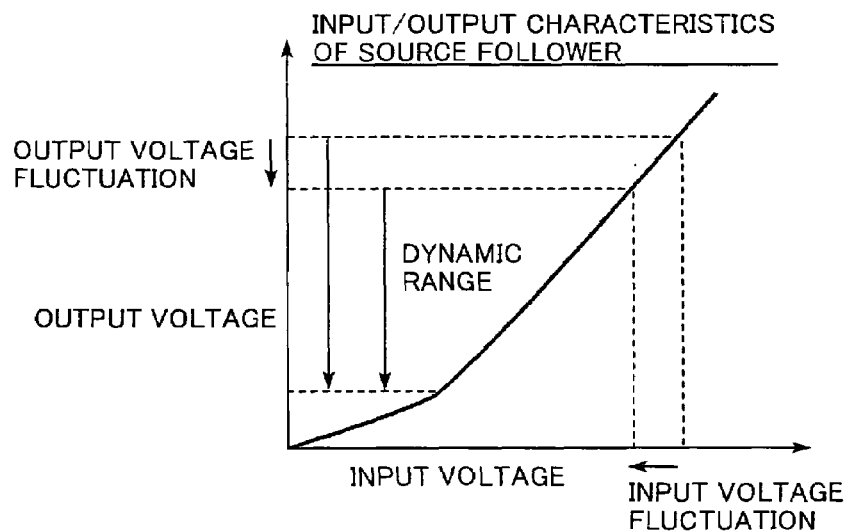
FIG. 7 is a view showing input/output characteristics of a source follower.
Figure 8:
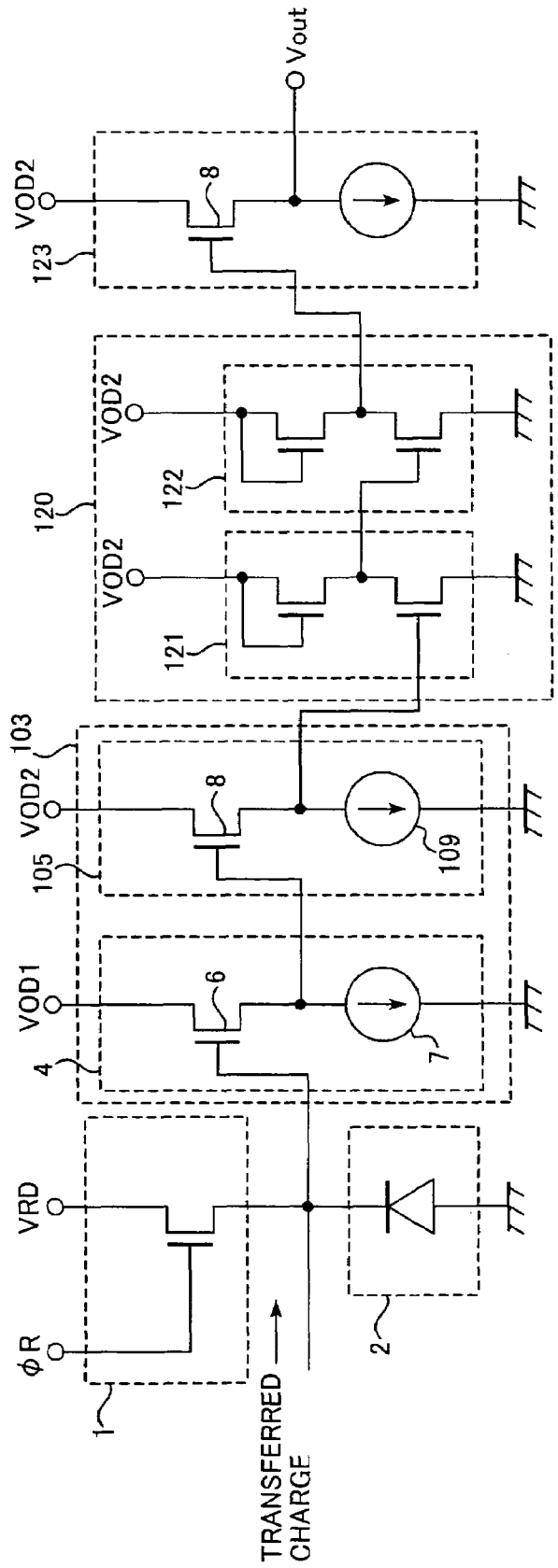
FIG. 8 is a schematic diagram showing another solid-state imaging apparatus according to a conventional technique.
Figure 9:
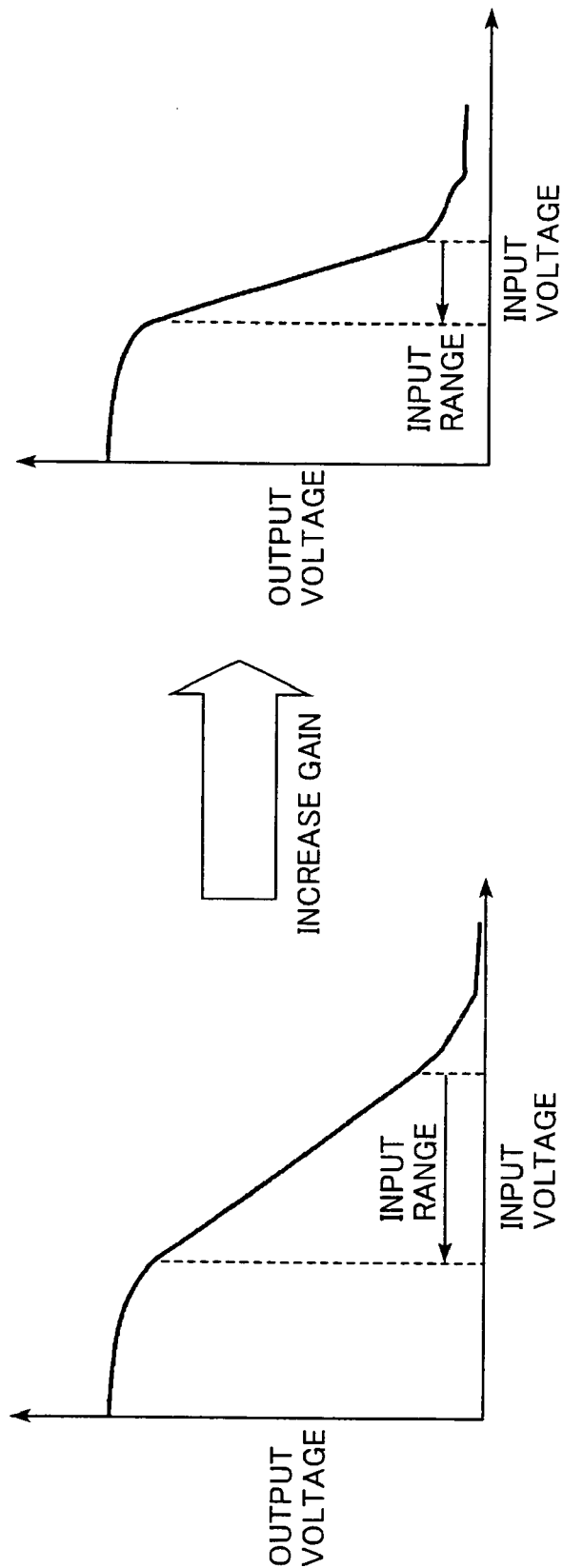
FIG. 9 is a view showing input/output characteristics of an inverter.

FIG. 1 is a schematic diagram according to an embodiment of the present invention. In the embodiment shown in FIG. 1, the same elements as in a conventional technique in FIG. 6 are denoted by the same reference symbols and not described in detail herein.

In a solid-state imaging apparatus of this embodiment, an output circuit 3 as a amplification unit for amplifying a photoelectric converted signal voltage is comprised of two-stage source follower 4 and 5. The output circuit 3 is different from the output circuit 103 of the conventional technique shown in FIG. 6 in that the output circuit 3 comprises a source follower 5 instead of the source follower 105. A source follower 4 is provided as a second source follower, and the source follower 5 is provided as a first source follower. Further, the source follower 5 is different from the source follower 105 in that the source follower 5 comprises a current source 9 which changes a current amount according to a fluctuation of a reset potential VRD.

The source follower 5 is described hereinafter in detail. The source follower 5 is comprised of a drive transistor 8, and a current source 9 that is connected to a source side of the drive transistor 8 and that changes the current amount according to the fluctuation of the reset potential VRD. In the current source 9, a transistor 10 as a load transistor and sources 11 and 12 that are connected to a gate electrode of the transistor 10 are provided. The voltage source 11 is comprised of transistors 13 and 14, which are supplied with a power supply voltage VOD 2 that supplies the source follower 5. Further, the voltage source 12 is comprised of transistors 15 and 16, which are supplied with the power supply voltage VRD that supplies the reset circuit 1. The power supply voltage VOD 2 being supplied to the source follower 5 is made lower than the power supply voltage VOD 1 being supplied to the reset potential VRD and the source follower 4. This is for reducing power consumption by lowering the voltage VOD 2 as a large current flows to the source follower 5 in comparison with the source follower 4 in order to improve frequency characteristics and drive capability.

By supplying the voltage source 11, which is supplied with the power supply voltage VOD 2 as with the source follower 5, to a gate electrode of the transistor 10 included in the current source 9, Vt fluctuation of the source follower 5 and characteristics for a fluctuation of the power supply voltage VOD 2 are determined. On the other hand, if the reset potential fluctuates, the fluctuation is absorbed by fluctuating input/output characteristic of the second stage source follower 5 using the voltage source 12, so that an influence of the fluctuation is not affected to a subsequent stage.

An operation of the source follower 5 is described hereinafter in detail in comparison with a conventional technique.

Figure 3A:
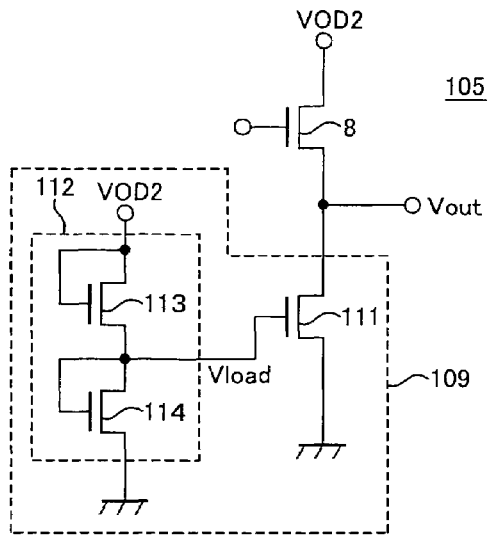
FIGS. 3A to 3C are views showing a schematic diagram and input/output characteristics of a source follower according to a conventional technique.
Figure 3B:
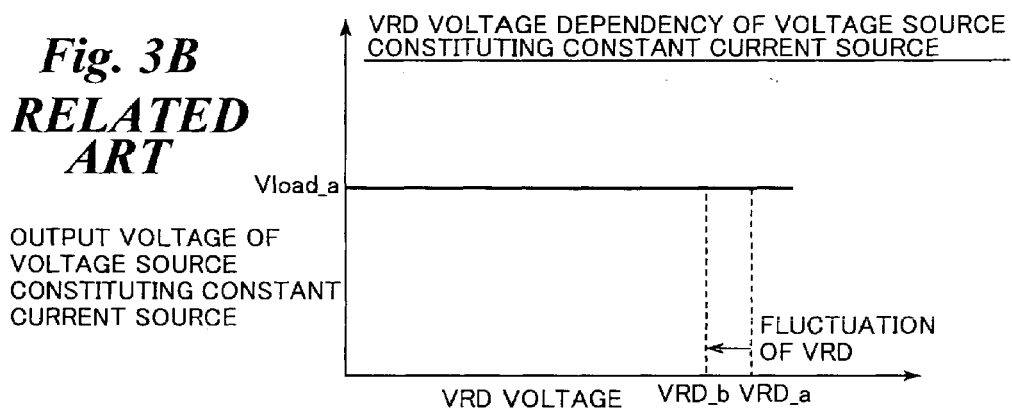
Figure 3C:
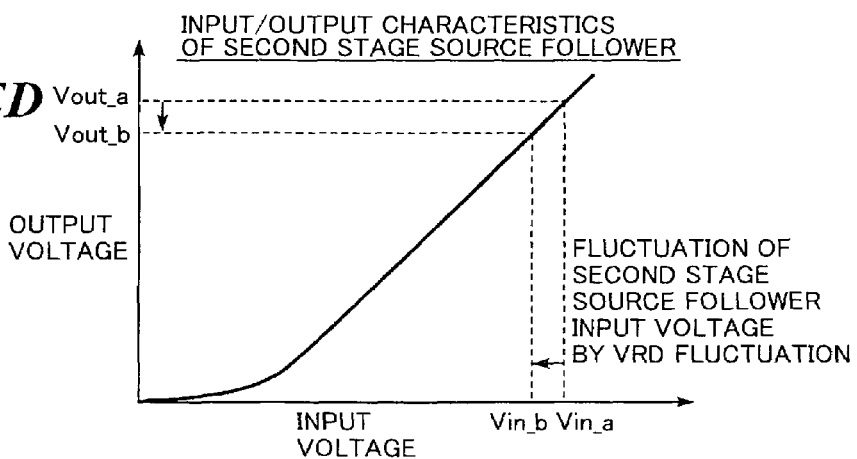
Figure 4:
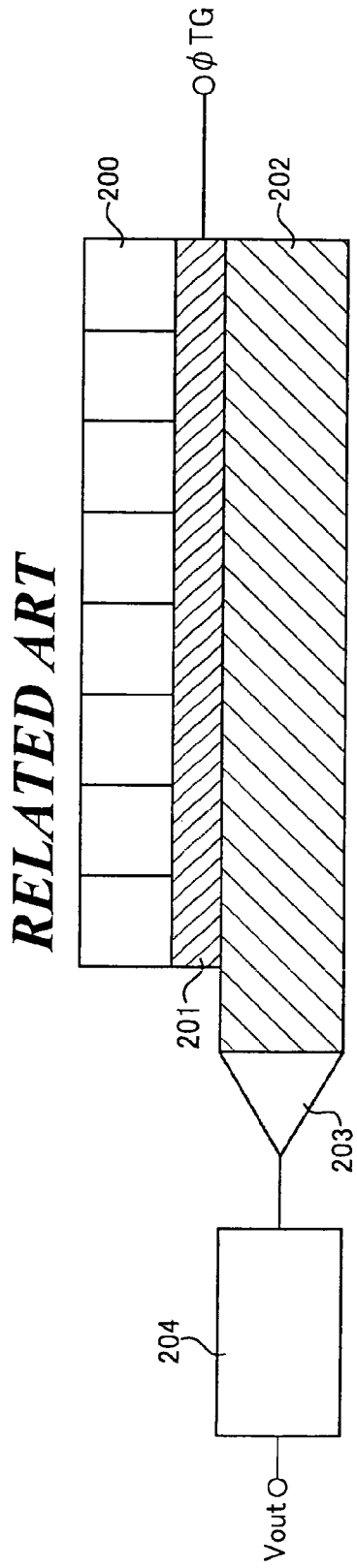
FIG. 4 is a schematic diagram showing a general linear image sensor.
Figure 5:
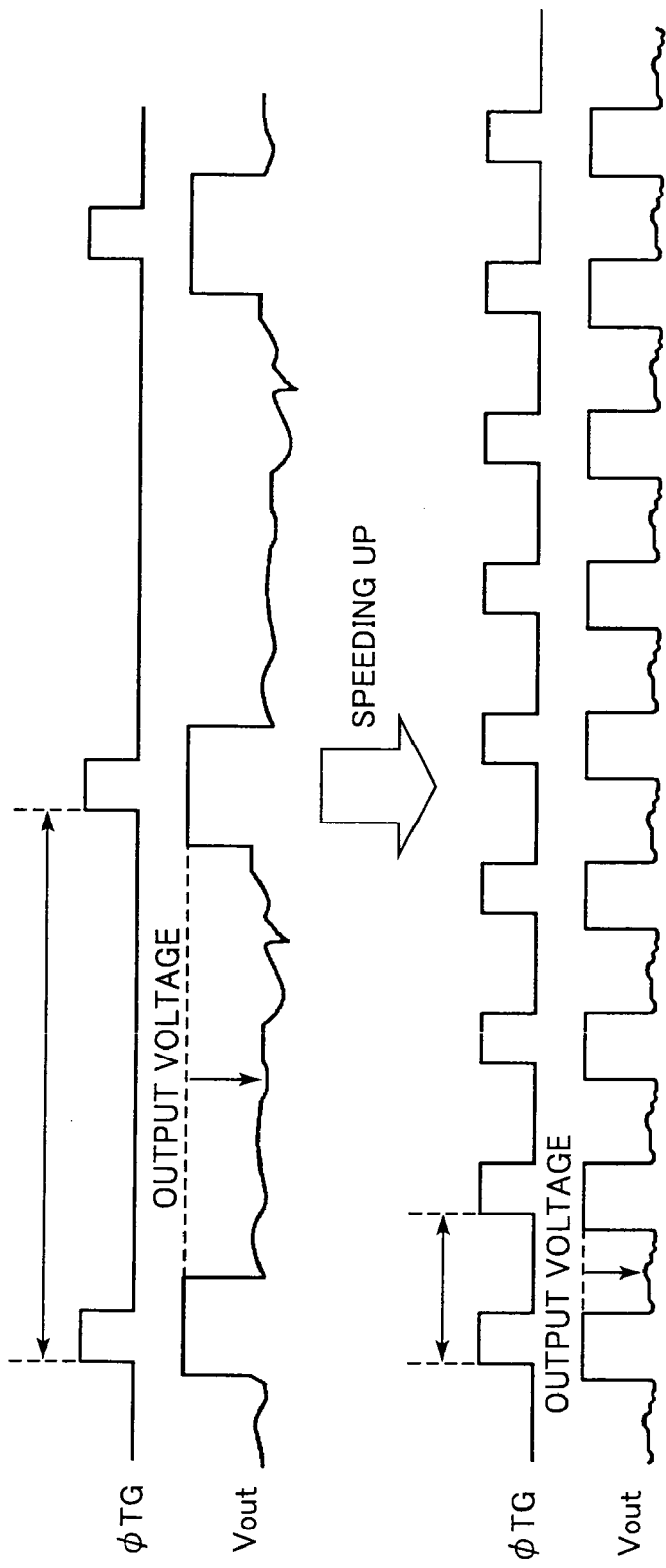
FIG. 5 is a view showing an operation of the linear image sensor.

FIG. 3A is a structure of a second stage source follower 105 according to a conventional technique. A constant current source 109 is comprised of a voltage source 112 that includes voltage sources 113 and 114, and a transistor 111 connected to the voltage source 112. The voltage source 112 is supplied with a power supply voltage VOD 2, which is supplied to the source follower 105. A case in which the reset potential VRD changes from VRD_a to VRD_b (VRD_a>VRD_b), and a case in which an input potential of the second stage source follower 105 changes from Vin_a to _Vinb (Vin_a>Vin_b) are explained hereinafter. FIG. 3B is a view showing a dependency of voltage source 112 on the VRD voltage. As shown in FIG. 3B, a voltage Vload_a outputted from the voltage source 112 remains constant regardless of a fluctuation of the reset potential VRD. Accordingly input/output characteristics of the source follower 105 does not change by a fluctuation of the reset potential VRD. Therefore, an output voltage of the source follower 105 is determined by the input/output characteristics of FIG. 3C. Specifically, if an input voltage changes from Vin_a to Vin_b due to a fluctuation of the reset potential VRD, the output voltage changes from Vout_a to Vout_b.

Figure 2A:
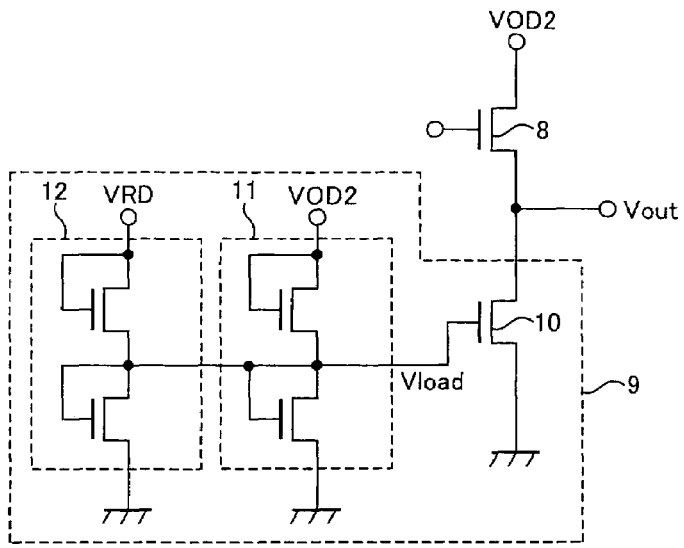
FIGS. 2A to 2C are views showing a schematic diagram and input/output characteristics of a source follower according to an embodiment of the present invention.
Figure 2B:
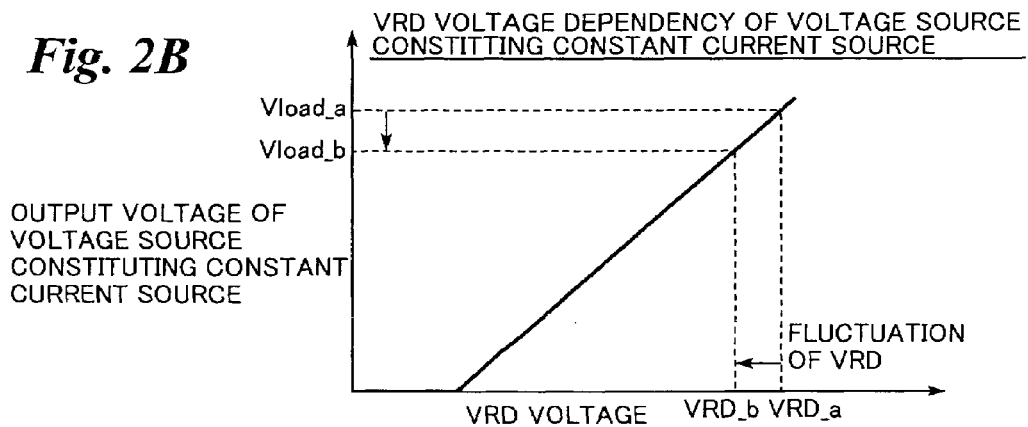
Figure 2C:
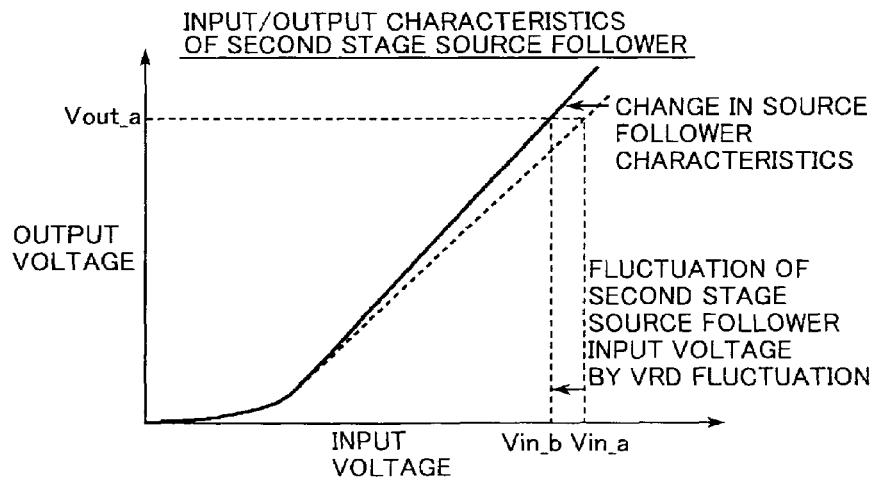

On the other hand, FIG. 2A shows a second stage source follower 5 according to the embodiment of the present invention. In this source follower 5, for example if the reset potential VRD changes from VRD_a to VRD_b (VRD_a>VRD_b), an output voltage of a voltage source changes from Vload_a to Vload_b (Vload_a>Vload_b) as shown in FIG. 2B. Then a gate voltage of the transistor 10 is reduced and current that flows the transistor 10 is reduced as well. This changes input/output characteristics of the source follower 5. Specifically, as shown in FIG. 2C, the input/output characteristics of the source follower changes from a dotted line to a solid line along with the fluctuation of the reset potential VRD. As described in the foregoing, an output voltage can be kept to Vout_a even if an input voltage changes from Vin_a to Vin_b. A fluctuation of the output voltage from a source follower induced by a fluctuation of the reset potential VRD can be suppressed in this way.

Although only one voltage source is usually used as a current source of a source follower, there are two voltage sources provided in this embodiment. However the voltage sources are purposed to determine a voltage and power that the voltage sources consume is extremely smaller than a through current that the source follower passes. Accordingly even if two voltage sources are provided to the source follower 5, an increase in a current amount is too small to be a problem.

Although this embodiment explains an output circuit having two-stage source follower and two voltage sources, it is not restricted to this but a similar effect can be obtained by providing three-stage source follower and three voltage sources.

It is apparent that the present invention is not limited to the above embodiment and it may be modified and changed without departing from the scope and spirit of the invention.

What is claimed is:

1. A solid-state imaging apparatus comprising:
   a plurality of photoelectric conversion devices;
   a charge transfer device for transferring a signal charge converted by the photoelectric conversion devices;
   a signal charge detection portion for converting the signal charge transferred by the charge transfer device into a signal voltage;
   a reset circuit for resetting a potential of the signal charge detection portion; and
   an amplification portion for amplifying the signal voltage, wherein the amplification portion comprises a first source follower supplied with a second power supply voltage different from a first power supply voltage being supplied to the reset circuit; and
   the first source follower comprises a driver transistor, and a current source that is connected to the driver transistor and changes a current amount according to a fluctuation of the first power supply voltage.

2. The solid-state imaging apparatus according to claim 1, wherein the current source reduces the current amount if the first power supply voltage changes to a smaller power supply voltage, and the current source increases the current amount if the first power supply voltage changes to a larger power supply voltage.

3. The solid-state imaging apparatus according to claim 1, wherein the current source comprises a first voltage source supplied with the first power supply voltage, a second voltage source supplied with the second power supply voltage, and a load transistor with a gate electrode being connected to outputs of the first and the second voltage sources.

4. The solid-state imaging apparatus according to claim 3, wherein the first voltage source comprises a first and a second transistors connected in series between the first power supply voltage and a ground potential;
   the second voltage source comprises a third and a fourth transistors connected in series between the first power supply voltage and a ground potential; and
   a node of the first and the second transistor and a node of the third and the fourth transistors are connected to the gate electrode.

5. The solid-state imaging apparatus according to claim 1, wherein the amplification portion further comprises a second source follower between the signal charge detection portion and the first source follower, and the second source follower is supplied with the first power supply voltage.

6. The solid-state imaging apparatus according to claim 2, wherein the amplification portion further comprises a second source follower between the signal charge detection portion and the first source follower, and the second source follower is supplied with the first power supply voltage.

7. The solid-state imaging apparatus according to claim 1, wherein the first power supply voltage is larger than the second power supply voltage.

8. The solid-state imaging apparatus according to claim 2, wherein the first power supply voltage is larger than the second power supply voltage.

9. The solid-state imaging apparatus according to claim 3, wherein the first power supply voltage is larger than the second power supply voltage.

10. The solid-state imaging apparatus according to claim 1, further comprising an inverter circuit connected to a subsequent stage of the amplification portion.

* * * * *